Aug. 19, 1930.  E. P. LARSH  1,773,427
SHAFT BEARING
Filed April 20, 1926
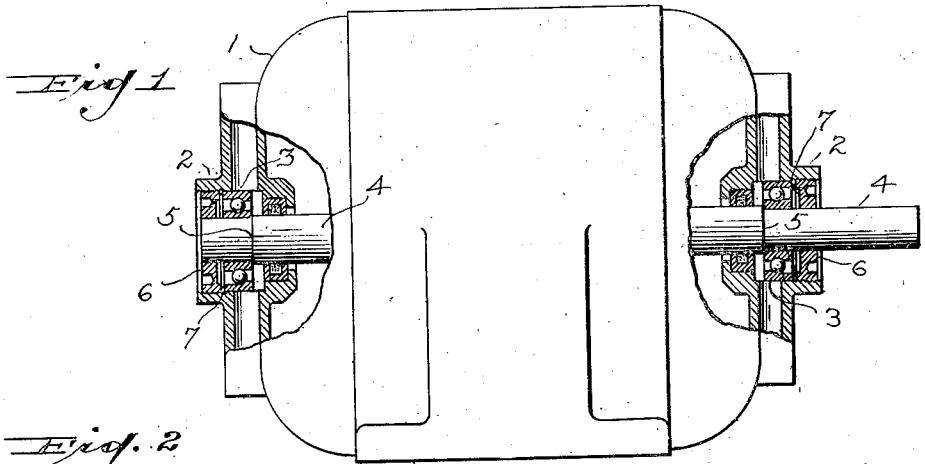
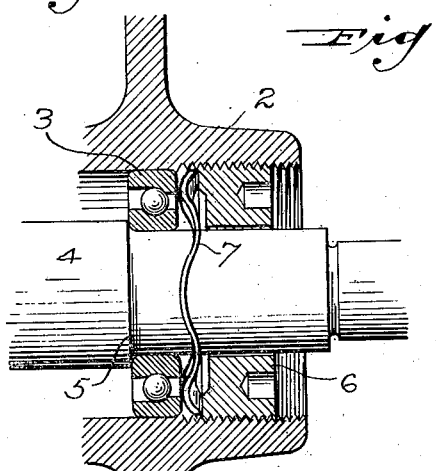
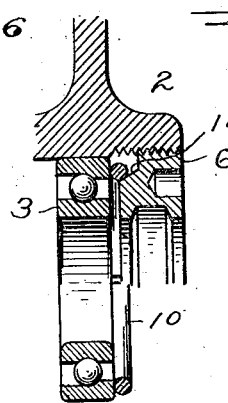
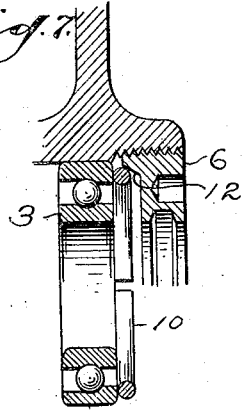
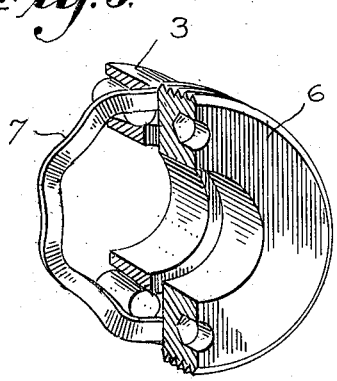
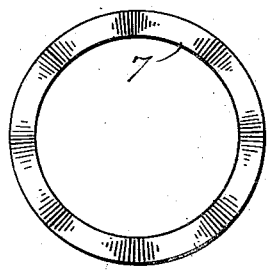
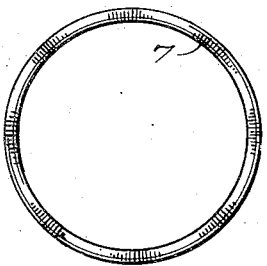
Inventor
Everett P. Larsh
By F. L. Walker
Attorney Patented Aug. 19, 1930

1,773,427

UNITED STATES PATENT OFFICE

EVERETT P. LARSH, OF DAYTON, OHIO, ASSIGNOR TO THE MASTER ELECTRIC COMPANY, OF DAYTON, OHIO, A CORPORATION OF OHIO

SHAFT BEARING

Application filed April 20, 1926. Serial No. 103,231.

My invention relates to shaft bearings and the like, and more particularly to an automatic take-up or compensating collar for use in connection with anti-friction bearing units.

The yielding compensating feature has been designed particularly for use in electric motors, although it is applicable to other analogous installations.

In the present construction there is contemplated a supporting frame, whether it be a motor frame or other structure, having a recessed bearing hub, in which is loosely mounted an anti-friction bearing collar for a rotary shaft. The bearing collar is fitted rather closely within the recess of the hub, but is capable of relative movement therein by which the outer race of the bearing unit may creep circumferentially and the bearing unit is further capable of a small axial movement to compensate for expansion and contraction of the shaft or the frame when subjected to variations of temperature.

Located contiguous to and bearing upon the anti-friction unit is a resilient spring collar, which exerts constant lateral pressure upon the bearing unit in an axial direction. This spring collar may assume various forms, the preferred form, however is that of a ring, made either from flat stock or from round wire, which though of uniformly circular outline in plan aspect, is corrugated or of undulating formation in a direction perpendicular to its plane. This resilient compensating ring or collar is interposed between the bearing unit and an abutment head or collar secured to the hub, and which may if desired form a closure for the recess of the hub. In lieu of this form of resilient compensating collar, this element may comprise a split ring having inherent expansive or contractive tendency, co-acting with a cam face upon the closure or abutment member, by which the ring is caused to exert a lateral pressure upon the anti-friction bearing unit.

The object of the invention is to simplify the structure, as well as the means and mode of operation of compensating or automatic take-up bearings for shafts and the like, whereby they will not only be cheapened in construction, but will be more efficient in operation, positive in action, uniform in their response to variations of thermal influence upon the bearing, and unlikely to get out of repair.

A further object of the invention is to provide an improved form of take-up bearing for electric motor armature shafts and the like, wherein the bearings at the opposite ends of the frame will be subjected to yielding pressure in opposition one to the other.

A further object of the invention is to provide an improved form of spring collar or compensating ring.

With the above primary and other incidental objects in view as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred, but obviously, not necessarily the only form of embodiment of the invention, Fig. 1 is a general view of an electric motor frame, having at its ends, spaced bearings for the armature shaft, to which the present invention has been applied. Fig. 2 is an enlarged sectional detail view of the bearing. Fig. 3 is a plan view of the resilient collar or compensating ring removed from the bearing. Fig. 4 illustrates a modified form of compensating ring. Fig. 5 is a perspective view showing the relation of the several bearing parts removed from the hub of the structure. Figs. 6 and 7 are detail sectional views illustrating further modifications of the structure.

Like parts are indicated by similar characters of reference throughout the several views.

In the accompanying drawing, 1 is a motor frame, having in the heads thereof recessed bearing hubs 2. Located within hubs 2 are anti-friction bearing units or collars 3. These units may be of any suitable or appropriate construction. Those in the drawings have been shown as ball bearings, although obviously roller bearings may be used in lieu thereof. The construction here described operates equally efficiently with roller bearings as with ball bearings. Likewise, it is to be understood that in lieu of the anti-friction bearings shown, the bearing collar may be a solid bearing ring of suitable material, inserted within the hub 2 of the frame. Journalled within such bearing collar or unit 3, whether the latter be a ball bearing, roller bearing or a solid bearing ring, is an armature shaft 4. In the present construction, the armature shaft 4 has been shown reduced in diameter or shouldered at its ends, the bearing unit being received upon such reduced portion against the peripheral shoulder 5 thereof. The bearing collar or unit 3 of whatever form is fitted comparatively closely and accurately to the interior of the hub 2, but is capable of relative movement therein. The outer race of the anti-friction unit is capable of creeping movement, while the unit as a whole is capable of further longitudinal or axial movement within the hub to compensate for expansion and contraction of the armature shaft 4. It will be understood that in various classes of machinery, and particularly in electric motors, changes of temperature to which the parts are subjected cause more or less variation thru expansion and contraction. Engaged with the hub 2 in spaced relation with the bearing unit or collar 3 is an abutment member 6. In the present case the abutment member 6 is a collar screw threaded within the hub 2. However, this abutment member may be connected in any other manner and may form a closure for the open end of the hub, or may in lieu thereof, comprise merely a ring or bushing secured within the hub. Interposed between the abutment member 6 and the bearing collar or unit 3 is a compensating ring or spring collar 7. This compensating ring is preferably formed from flat stock and is of circular form. The ring, however, is corrugated or formed with a succession of undulations perpendicular to the general plane of the ring. The crowns of these undulations or corrugations bear at one side upon the abutment member 6 and upon the opposite side against the bearing collar or unit 3. The collar or ring being under compression, thereby exerts a lateral pressure against the bearing ring 3 in an axial direction. A compensating collar or ring 7 being located at the outer side of the respective bearing units at each end of the motor frame exerts its pressure inwardly, each toward the other.

In lieu of the compensating ring being formed from flat stock as shown in Fig. 3, it may be formed from wire or round stock as shown in Fig. 4. The application and function of the ring, however, is quite the same as that described.

In lieu of corrugating the compensating ring or forming it with the succession of yielding undulations as described, there may be employed a split spring ring 10, as shown in Figs. 6 and 7. In Fig. 6 the abutment member has been shown provided with an inwardly extending beveled shoulder 11. The split spring ring 10 bears upon the beveled periphery of this shoulder 11, and due to its contractive tendency or tension, the ring tends to slide down the beveled shoulder, against the bearing collar or unit 3. In this case, the contractive tendency of the split ring, co-acting with the external beveled shoulder causes the ring 10 to exert a lateral pressure against the bearing collar or unit 3. In Fig. 7 this relation is reversed. The abutment member is provided with an interiorly beveled shoulder 12, against which the split ring 10 engages with expansive tension. The tendency of the ring 10 to expand within the beveled shoulder 12 effects a camming action by which the ring tends to move laterally, exerting lateral pressure against the bearing unit 3. The effect and result is the same in each case, and similar to that achieved by the undulating or corrugated compensating ring before described.

The action of the compensating ring of whichever form employed, by pushing against the outer race or cup of the bearing unit, serves to keep the bearing tight at all times, and compensates for wear of the parts in addition to permitting a yielding movement of the bearing collar, to compensate for expansion and contraction under varying thermal conditions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. A shaft bearing or the like, a supporting member including a recessed hub portion, an antifriction bearing collar loosely positioned within the recessed hub, an adjustable closure member for the hub, a tapered cam surface thereon, and a tension member interposed between the closure member and the bearing collar and in engagement with the cam surfaces possessing an inherent spring tension reacting upon the cam surface, by which said tension member exerts a constant yielding pressure upon the bearing collar in an axial direction which tension is variable by adjustment of the closure member.

2. In an electric motor or the like, wherein a shaft is mounted in spaced bearings, a frame member including oppositely disposed recessed hub portions, anti-friction bearing collars loosely mounted with the recesses of the respective hubs, and resilient pressure collars located at the outer sides of the respective bearing collars exerting their pressure inwardly against the corresponding bearing collars tending to press said collars each toward the other and adjustable abutments having thereon tapered surfaces exerting substantially radial pressure upon said resilient collar, and a shaft mounted in said bearing collars.

3. In an electric motor or the like, a main frame having oppositely disposed recessed hub portions, anti-friction bearing collars loosely positioned within the recesses of the hubs, annular spring collars also within said hubs, and abutment members confining said spring collars under pressure and cam surfaces upon said abutment members tending to place the collars under circumferential tension, the reactions of which exert axial pressure upon the antifriction bearing collars.

In testimony whereof, I have hereunto set my hand this 5th day of April A. D. 1926.

EVERETT P. LARSH.